(12) United States Patent
Thompson et al.

(10) Patent No.: US 6,907,247 B2
(45) Date of Patent: Jun. 14, 2005

(54) TRANSFER OF DATA PACKETS IN A WIRELESS TELECOMMUNICATIONS SYSTEM

(75) Inventors: Jonathan Andrew Thompson, Newbury (GB); Neil Andrew Wilson, Sunbury-on-Thames (GB)

(73) Assignee: Airspan Networks, Inc. PTSGE Corp., Seattle, WA (US)

( * ) Notice: Subject to any disclaimer, the term of this patent is extended or adjusted under 35 U.S.C. 154(b) by 663 days.

(21) Appl. No.: 09/802,239

(22) Filed: Mar. 8, 2001

(65) Prior Publication Data

US 2002/0019236 A1 Feb. 14, 2002

(30) Foreign Application Priority Data

Aug. 9, 2000 (GB) .............................. 0019620

(51) Int. Cl.[7] .................................. H04Q 7/20
(52) U.S. Cl. .................. 455/450; 370/329; 370/468
(58) Field of Search ................ 370/443, 348, 370/341, 329, 468, 328, 338, 441; 455/450, 464, 452.1, 453, 509, 454, 552.1, 560

(56) References Cited

U.S. PATENT DOCUMENTS

| | | | |
|---|---|---|---|
| 5,430,724 A | * | 7/1995 | Fall et al. .................... 370/337 |
| 5,446,739 A | * | 8/1995 | Nakano et al. .............. 370/337 |
| 5,615,212 A | * | 3/1997 | Ruszczyk et al. ........... 370/433 |
| 5,752,193 A | * | 5/1998 | Scholefield et al. ..... 455/452.2 |
| 5,886,984 A | | 3/1999 | Abu-Amara et al. |
| 6,088,578 A | * | 7/2000 | Manning et al. .............. 455/68 |
| 6,504,837 B1 | * | 1/2003 | Menzel ....................... 370/351 |
| 6,678,281 B1 | * | 1/2004 | Chakrabarti et al. ........ 370/438 |

FOREIGN PATENT DOCUMENTS

| | | |
|---|---|---|
| GB | 2 296 844 A | 7/1996 |
| GB | 2339645 A | 2/2000 |
| WO | WO 88/08646 | 11/1988 |
| WO | WO9744980 | 11/1997 |

* cited by examiner

*Primary Examiner*—Marsha D. Banks-Harold
*Assistant Examiner*—Nghi H. Ly
(74) *Attorney, Agent, or Firm*—Haynes Beffel & Wolfeld LLP

(57) ABSTRACT

A wireless telecommunications system is provided for connecting to a data link and for routing data packets between the data link and a subscriber terminal. The wireless telecommunications system provides a group of communication channels arranged to utilise a radio resource. The group is shared by a plurality of subscriber terminals. A subscriber controller within the subscriber terminal is arranged, when a data packet is to be transmitted to the data link, to acquire a communication channel from the group to enable that data packet to be transmitted. A resource monitor is then used to receive information concerning traffic loading, and to apply predetermined criteria to determine how long the communication channel may be acquired for by the subscriber terminal before causing the subscriber controller to release the communication channel.

15 Claims, 11 Drawing Sheets

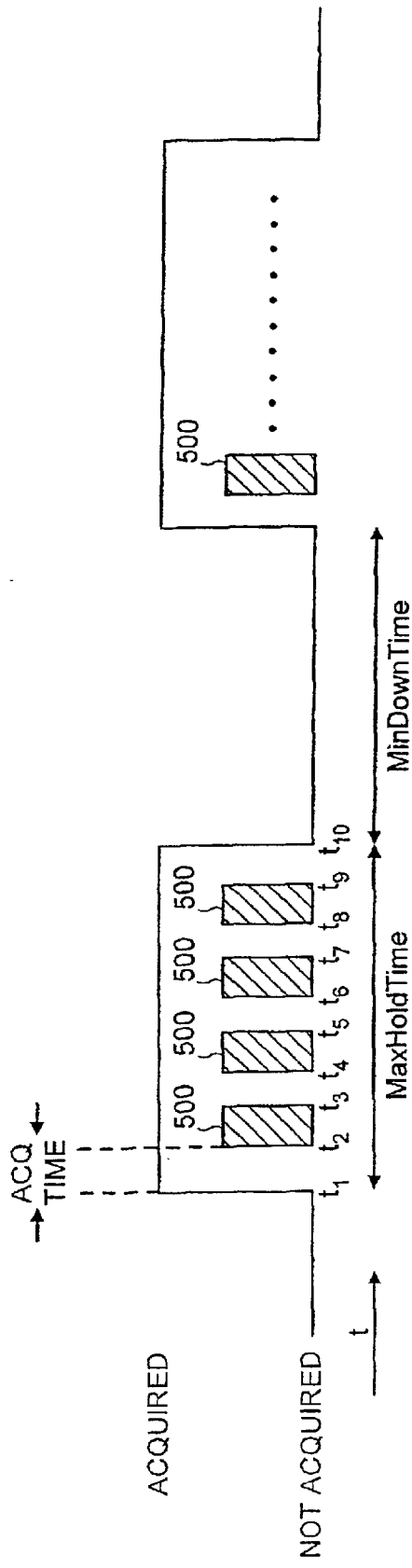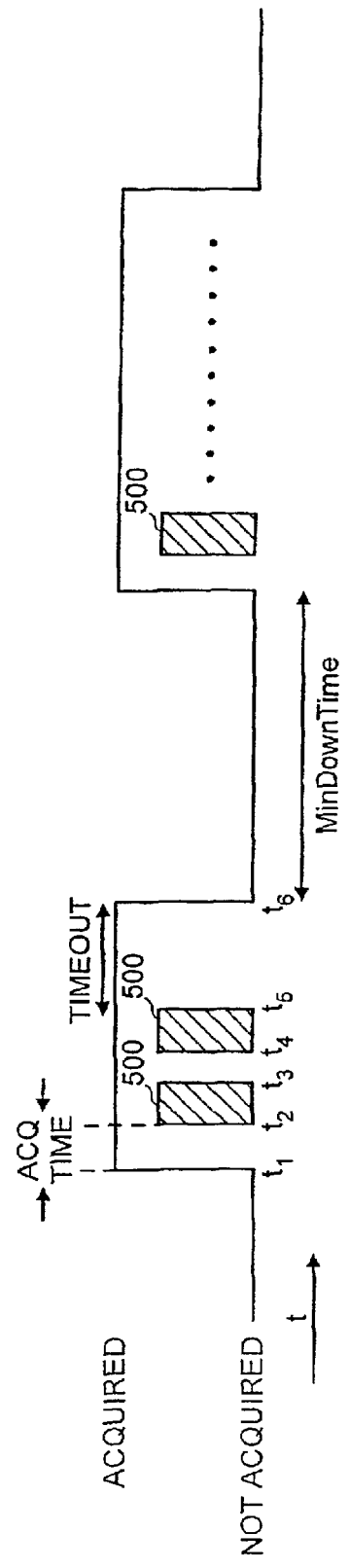

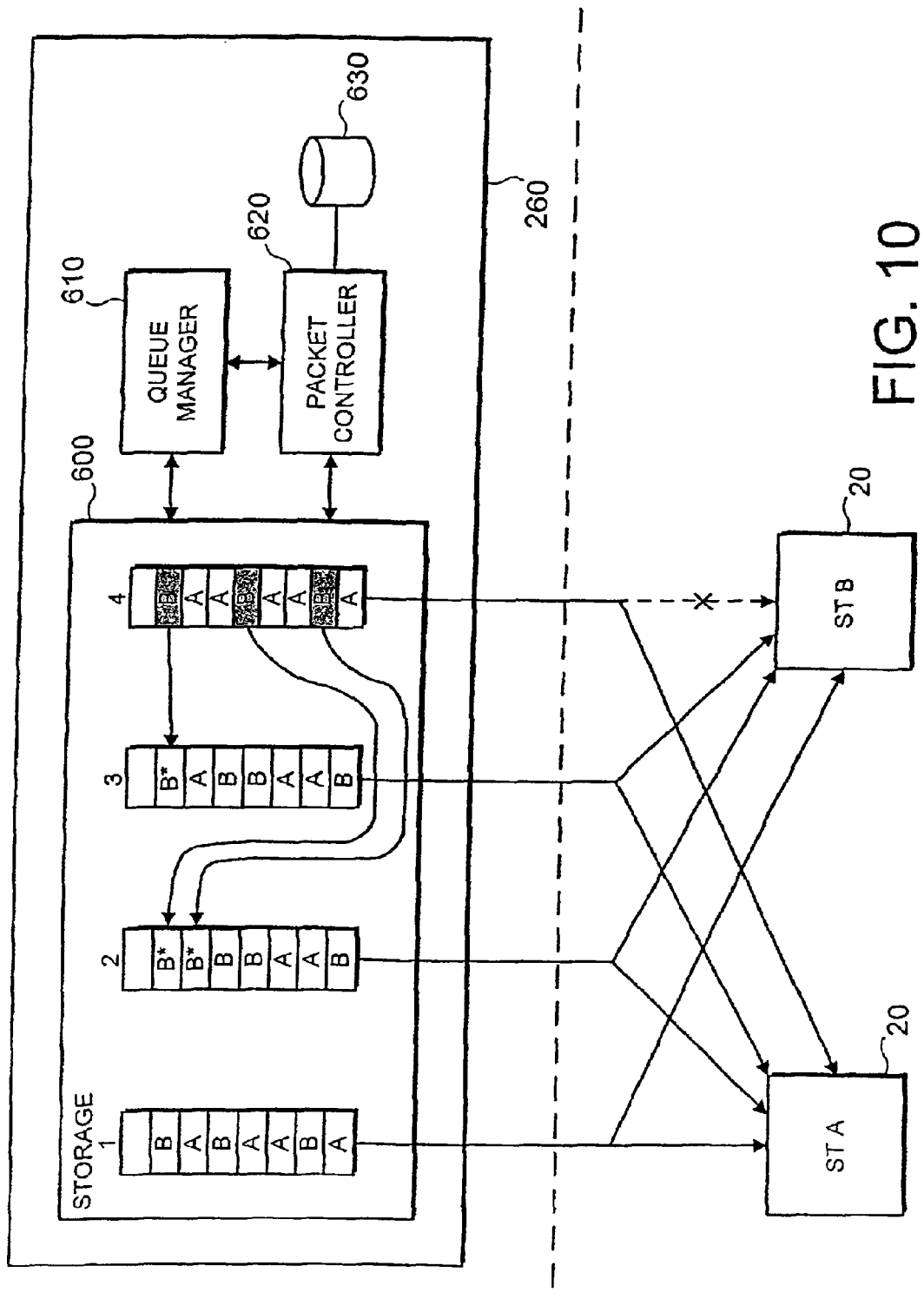

TRANSFER OF DATA PACKETS IN A WIRELESS TELECOMMUNICATIONS SYSTEM

BACKGROUND OF THE INVENTION

1. Field of the Invention

The present invention relates generally to the transfer of data packets in a wireless telecommunications system, and more particularly to the routing of data packets between a data link connectable to the wireless telecommunications system and a subscriber terminal of the wireless telecommunications system.

2. Description of the Prior Art

In a typical wireless telecommunications system, a subscriber terminal may be located at a subscriber's premises for handling voice and data calls to and from that subscriber. One or more lines may be provided from the subscriber terminal for supporting one or more items of telecommunications equipment located at the subscriber's premises. Further, a central terminal may be provided for controlling a number of subscriber terminals, and in particular for managing calls between a subscriber terminal and other components of a wireless telecommunications network.

Each subscriber terminal communicates with the central terminal via a radio resource. In accordance with known techniques, multiple communication channels may be arranged to utilize the radio resource for the transmission of signals to and from the subscriber terminal. For example, in a "Code Division Multiple Access" (CDMA) system, a radio resource consisting of a particular frequency channel may be partitioned by applying different orthogonal codes to signals to be transmitted on that frequency channel. Signals to which an orthogonal code has been applied can be considered as being transmitted over a corresponding orthogonal communication channel utilizing the particular frequency channel. Similarly, in a "Time Division Multiple Access" (TDMA) system, a radio resource consisting of a particular frequency channel can be partitioned in the time domain, such that a number of different signals can be transmitted in different time slots, the time slots forming multiple communication channels utilizing the radio resource. As another example, in a "Frequency Division Multiple Access" (FDMA) system, a radio resource consisting of a band of frequencies may be partitioned to form a number of communication channels at particular frequencies, thereby enabling multiple signals to be transmitted over the radio resource.

Nowadays, there is an ever increasing demand for wireless telecommunications systems to be able to transmit data at higher and higher speeds, and this in turn requires the wireless telecommunications system to provide a wireless link with enough bandwidth to support such data transmissions. One way to transmit data is using a packet-based approach, where data is sent in discrete blocks (hereafter called "data packets"), and the communication channels are allocated as and when data packets are required to be sent (as contrasted with a typical voice call, where a communication channel is allocated for the duration of the call).

It is an object of the present invention to provide an efficient technique for transferring data packets in a wireless telecommunications system.

SUMMARY OF THE INVENTION

Viewed from a first aspect, the present invention provides a wireless telecommunications system for connecting to a data link and for routing data packets between the data link and a subscriber terminal of the wireless telecommunications system, the subscriber terminal being connectable to a central terminal of the wireless telecommunications system via a radio resource, the wireless telecommunications system providing a group of communication channels arranged to utilize the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the wireless telecommunications system further comprising: a subscriber controller within the subscriber terminal arranged, when a data packet is to be transmitted to the data link, to acquire an uplink communication channel from the group to enable that data packet to be transmitted via the central terminal to the data link; and a resource monitor for receiving information concerning the traffic loading of predetermined elements of the wireless telecommunications system, and for applying predetermined criteria based on that information to determine how long the uplink communication channel may be acquired for by the subscriber terminal before causing the subscriber controller to release the uplink communication channel for use by other subscriber terminals.

To provide sufficient bandwidth for data communications, it is proposed to form as a group a number of communication channels that are arranged to utilize the radio resource for transmission of data packets, this group being shared by a plurality of subscriber terminals. Whilst the handling of transmission of data packets to the subscriber terminals can be handled centrally to make efficient use of the available downlink communication channels in the group, a mechanism is required to enable each subscriber terminal to make efficient use of the available uplink communication channels for transmitting data packets from the subscriber terminal to the data link.

Since the communication channels in the group are shared, it is not possible for each subscriber terminal to permanently acquire an uplink communication channel for this purpose. Accordingly, one approach would be to treat each data packet as a micro-call, whereby when a subscriber terminal has a data packet to send, it acquires an uplink communication channel, sends the data packet, and then releases the uplink communication channel for use by other subscriber terminals. However, the time taken to acquire and release the uplink communication channel in such a wireless telecommunications system is typically non-trivial, and hence will significantly impact the efficiency of such an approach.

Hence, in accordance with the present invention, a number of communication channels are formed as a packet group for transmission of data packets to and from the subscriber terminal. Further, a subscriber controller within the subscriber terminal is arranged, when a data packet is to be transmitted by the subscriber terminal, to acquire an uplink communication channel from the group to enable the data packet to be transmitted.

In addition, a resource monitor is provided (either within the subscriber terminal or as a separate element of the wireless telecommunications system) for receiving information concerning the traffic loading of predetermined elements of the wireless telecommunications system, and for applying predetermined criteria based on that information to determine how long the uplink communication channel may be acquired for by the subscriber terminal before causing the subscriber controller to release the uplink communication channel for use by other subscriber terminals.

It will be appreciated that the above approach enables the time a subscriber terminal is allowed to keep an uplink communication channel acquired for its own use to be managed having regard to prevailing traffic conditions, thereby enabling efficient management of the shared communication channels in the group.

In preferred embodiments, the wireless telecommunications system further comprises a congestion determination unit for determining the information concerning the traffic loading of the predetermined elements of the wireless telecommunications system and for periodically broadcasting that information to the subscriber terminal, the resource monitor being provided within the subscriber terminal and being arranged to use that broadcast information when applying the predetermined criteria.

Hence, in preferred embodiments, a resource monitor is provided within each subscriber terminal, and traffic loading information determined centrally is broadcast periodically to the subscriber terminals for use by each resource monitor. The information broadcast by the congestion determination unit may be raw data concerning traffic loading for use by each resource monitor, or alternatively may be data generated by the congestion determination unit based on the traffic loading information.

It will be appreciated that the resource monitor may be arranged to apply a predetermined criteria based solely on the information broadcast by the congestion determination unit. However, in preferred embodiments, the resource monitor is further arranged to receive local information relating to its subscriber terminal and uses that local information in addition to the broadcast information when applying the predetermined criteria. An example of such local information would be a service grade parameter defining the grade of service applicable to that subscriber terminal. Accordingly, in such preferred embodiments, the predetermined criteria applied by the resource monitor take account of the loading of the wireless telecommunications system as indicated by the information broadcast by the congestion determination unit, along with specific local information relating to the subscriber terminal.

In preferred embodiments, the resource monitor is arranged to determine from the received information a first parameter identifying the maximum hold time of the uplink communication channel after which it must be released even if more data packets are waiting to be sent by the subscriber terminal, the first parameter being used by the resource monitor when applying the predetermined criteria. By this approach, it will be appreciated that even if the subscriber terminal is itself busy, and has a steady stream of data packets to transmit, it will not be allowed to retain the uplink communication channel indefinitely for its own use, but instead will be forced after a predetermined time to release the communication channel for use by another subscriber terminal.

Preferably, the resource monitor is arranged to determine from the received information a second parameter identifying the minimum time the uplink communication channel must be released for before another acquisition of an uplink channel in the group is attempted by the subscriber terminal, the second parameter being used by the resource monitor when applying the predetermined criteria. Hence, through use of the second parameter, it is ensured that other subscriber terminals have an opportunity to acquire the uplink communication channel released by a particular subscriber terminal before that particular subscriber terminal is again able to seek to acquire that uplink communication channel.

In preferred embodiments, the resource monitor is arranged to determine a third parameter identifying a programmable timeout period, the third parameter being used by the resource monitor when applying the predetermined criteria, such that after each data packet is sent, the programmable timeout period is reset, and if no further packets have been sent by the time the programmable timeout period expires, the uplink communication channel is released by the subscriber terminal. Hence, in this preferred embodiment, the subscriber terminal may speculatively maintain acquisition of the uplink communication channel in anticipation of having further data packets to send, but only for a predetermined time, and if the time out period expires without such a data packet being generated for transmission, then the subscriber terminal is forced to release the uplink communication channel.

Preferably, the predetermined criteria may take account of both the first and the third parameter, whereby even if the programmable timeout period has not expired, the uplink communication channel will still be released if the maximum hold time of the uplink communication channel has been reached. In addition, it can be seen that the subscriber terminal will not necessarily be able to retain the uplink communication channel for the maximum hold time if it enters a quiet period, since in that event the programmable time out period may well expire first, and cause the subscriber terminal to release the uplink communication channel even though the maximum hold time has not been reached.

It will be appreciated that there are a number of ways in which the information concerning the traffic loading of the predetermined elements of the wireless telecommunications system may be determined by the congestion determination unit. However, in preferred embodiments, the information is determined by the congestion determination unit based on the actual traffic information from those predetermined elements of the wireless telecommunications system, and the number of communication channels in the group. If multiple groups are defined for handling data packets, then preferably the congestion determination unit takes account of the total number of communication channels specified in those groups.

It will be appreciated that the radio resource, and the multiple communication channels utilizing the radio resource, may take a variety of forms. For example, the radio resource may be a frequency band, and the multiple communication channels may be particular frequencies within that frequency band. Alternatively, in a TDMA system, the radio resource may be a particular frequency channel, and the multiple communication channels may be individual time slots provided within that frequency channel. However, in preferred embodiments, the wireless telecommunications system is Code Division Multiple Access (CDMA) system, wherein the radio resource is one or more frequency channels, and the communication channels are orthogonal channels.

It will be appreciated that the group of communication channels provided for transmission of data packets may be fixed, or provision may be made for changing the communication channels within the group over time. In preferred embodiments, the group of communication channels is programmable, and information identifying the communication channels forming the group is distributed to the subscriber terminal over a broadcast communication channel. Groups may be defined for individual subscriber terminals, or alternatively a group may be applicable to a plurality of subscriber terminals.

Viewed from a second aspect, the present invention provides a subscriber terminal for a wireless telecommunications system arranged to handle data packets routed between a data link and the subscriber terminal via the wireless telecommunications system, the subscriber terminal being connectable to a central terminal of the wireless telecommunications system via a radio resource, the wireless telecommunications system providing a group of communication channels arranged to utilize the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the subscriber terminal comprising: a subscriber controller arranged, when a data packet is to be transmitted to the data link, to acquire an uplink communication channel from the group to enable that data packet to be transmitted via the central terminal to the data link; and a resource monitor for receiving information concerning the traffic loading of predetermined elements of the wireless telecommunications system, and for applying predetermined criteria based on that information to determine how long the uplink communication channel may be acquired for by the subscriber terminal before causing the subscriber controller to release the uplink communication channel for use by other subscriber terminals.

Viewed from a third aspect, the present invention provides a method of operating a wireless telecommunications system to route data packets between a data link connected to the wireless telecommunications system and a subscriber terminal of the wireless telecommunications system, the subscriber terminal being connectable to a central terminal of the wireless telecommunications system via a radio resource, the wireless telecommunications system providing a group of communication channels arranged to utilize the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the method comprising the steps of: (a) when a data packet is to be transmitted to the data link by the subscriber terminal, causing the subscriber terminal to acquire an uplink communication channel from the group to enable that data packet to be transmitted via the central terminal to the data link; (b) receiving information concerning the traffic loading of predetermined elements of the wireless telecommunications system; (c) applying predetermined criteria based on the information received at said step (b) to determine how long the uplink communication channel may be acquired for by the subscriber terminal before being released by the subscriber terminal for use by other subscriber terminals; and (d) causing the subscriber terminal to release the uplink communication channel when indicated by the determination performed at said step (c).

Viewed from a fourth aspect, the present invention provides a computer program operable to configure a wireless telecommunications system to perform a method in accordance with the third aspect of the present invention. The present invention may also provide a carrier medium comprising a computer program in accordance with the fourth aspect of the present invention.

BRIEF DESCRIPTION OF THE DRAWINGS

The present invention will be described further, by way of example only, with reference to a preferred embodiment thereof as illustrated in the accompanying drawings, in which:

FIGS. 8A and 8B are diagrams illustrating some parameters calculated by the wireless telecommunications system of preferred embodiments of the present invention to control the length of time that an uplink communication channel is acquired for by a subscriber terminal;

FIG. 10 is a diagram illustrating a queue management approach employed in preferred embodiments of the present invention.

DESCRIPTION OF PREFERRED EMBODIMENT

Before describing a preferred embodiment of the present invention, an example of such a wireless telecommunications system in which the present invention may be employed will first be discussed with reference to FIGS. 1 to 3.

Figure 1:
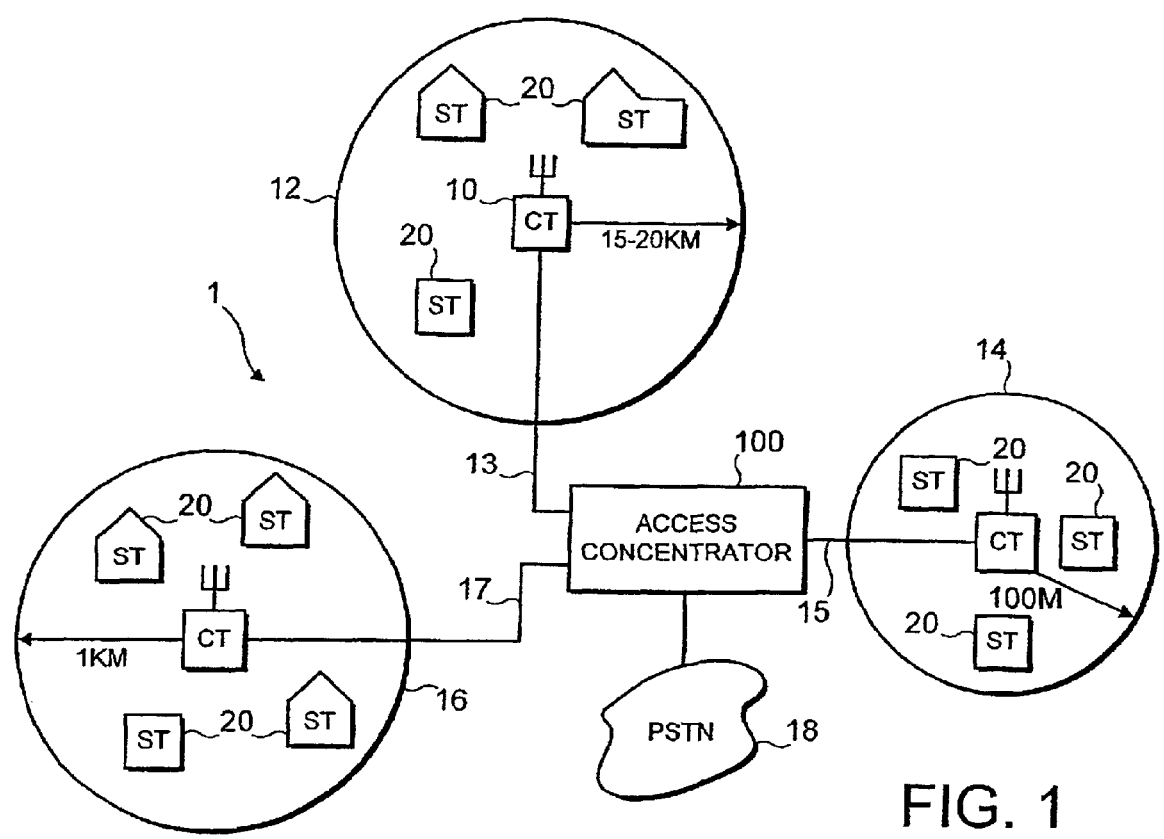
FIG. 1 is a schematic overview of an example of a wireless telecommunications system in which the present invention may be employed.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The wireless telecommunications system of FIG. 1 is based on providing radio links between subscriber terminals 20 at fixed locations within a service area (e.g., 12, 14, 16) and the central terminal 10 for that service area. These wireless radio links are established over predetermined frequency channels, a frequency channel typically consisting of one frequency for uplink signals from a subscriber terminal to the central terminal, and another frequency for downlink signals from the central terminal to the subscriber terminal.

Due to bandwidth constraints, it is not practical for each individual subscriber terminal to have its own dedicated frequency channel for communicating with a central terminal. Hence, techniques have been developed to enable data items relating to different wireless links (i.e. different ST-CT communications) to be transmitted simultaneously on the same frequency channel without interfering with each other. One such technique involves the use of a "Code Division Multiple Access" (CDMA) technique whereby a set of orthogonal codes may be applied to the data to be transmitted on a particular frequency channel, data items relating to different wireless links being combined with different orthogonal codes from the set. Signals to which an orthogonal code has been applied can be considered as being transmitted over a corresponding orthogonal channel within a particular frequency channel.

One way of operating such a wireless telecommunications system is in a fixed assignment mode, where a particular ST is directly associated with a particular orthogonal channel of a particular frequency channel. Calls to and from items of telecommunications equipment connected to that ST will always be handled by that orthogonal channel on that particular frequency channel, the orthogonal channel always being available and dedicated to that particular ST. Each CT 10 can then be connected directly to the switch of a public switched telephone network (PSTN).

However, as the number of users of telecommunications networks increases, so there is an ever-increasing demand for such networks to be able to support more users. To increase the number of users that may be supported by a single central terminal, an alternative way of operating such a wireless telecommunications system is in a Demand Assignment mode, in which a larger number of STs are associated with the central terminal than the number of traffic-bearing orthogonal channels available to handle wireless links with those STs, the exact number supported depending on the level of dial tone service that the service provider desires. These orthogonal channels are then assigned to particular STs on demand as needed. This approach means that far more STs can be supported by a single central terminal than is possible in a fixed assignment mode, the exact number supported depending on the level of dial tone service that the service provider desires. In preferred embodiments of the present invention, each subscriber terminal 20 is provided with a demand-based access to its central terminal 10, so that the number of subscribers which can be serviced exceeds the number of available wireless links.

However, the use of a Demand Assignment mode complicates the interface between the central terminal and the switch of the PSTN. On the switch side interface, the CT must provide services to the switch as though all of the subscribers are connected with direct service even though they may not be actually acquired to a radio frequency channel. Regardless of whether the ST is acquired or not to the switch, all of the subscribers must have a presence at the interface to the switch. Without some form of concentration, it is clear that a large number of interfaces to the switch would need to be provided. However, most PSTN switches still use unconcentrated interfaces, for example V5.1 or CAS, and only relatively few use concentrated interfaces, such as TR303 or V5.2.

To avoid each central terminal having to provide such a large number of interfaces to the switch, an Access Concentrator (AC) 100 is preferably provided between the central terminals and the switch of the PSTN, which transmits signals to, and receives signals from, the central terminal using concentrated interfaces, but maintains an unconcentrated interface to the switch, protocol conversion and mapping functions being employed within the access concentrator to convert signals from a concentrated format to an unconcentrated format, and vice versa. Accordingly, as shown in FIG. 1, the CTs 10 are connected to the AC 100 via backhaul links 13, 15 and 17, with the AC 100 then providing the connection with the PSTN 18. The backhaul links can use copper wires, optical fibres, satellites, microwaves, etc.

It will be appreciated by those skilled in the art that, although the access concentrator 100 is illustrated in FIG. 1 as a separate unit to the central terminal 10, and indeed this is the preferred implementation, it is also possible that the functions of the access concentrator could be provided within the central terminal 10 in situations where that was deemed appropriate.

For general background information on how the AC, CT and ST communicate with each other to handle calls in a Demand Assignment mode, the reader is referred to GB-A-2,326,310 and GB-A-2,326,311.

Figure 2:
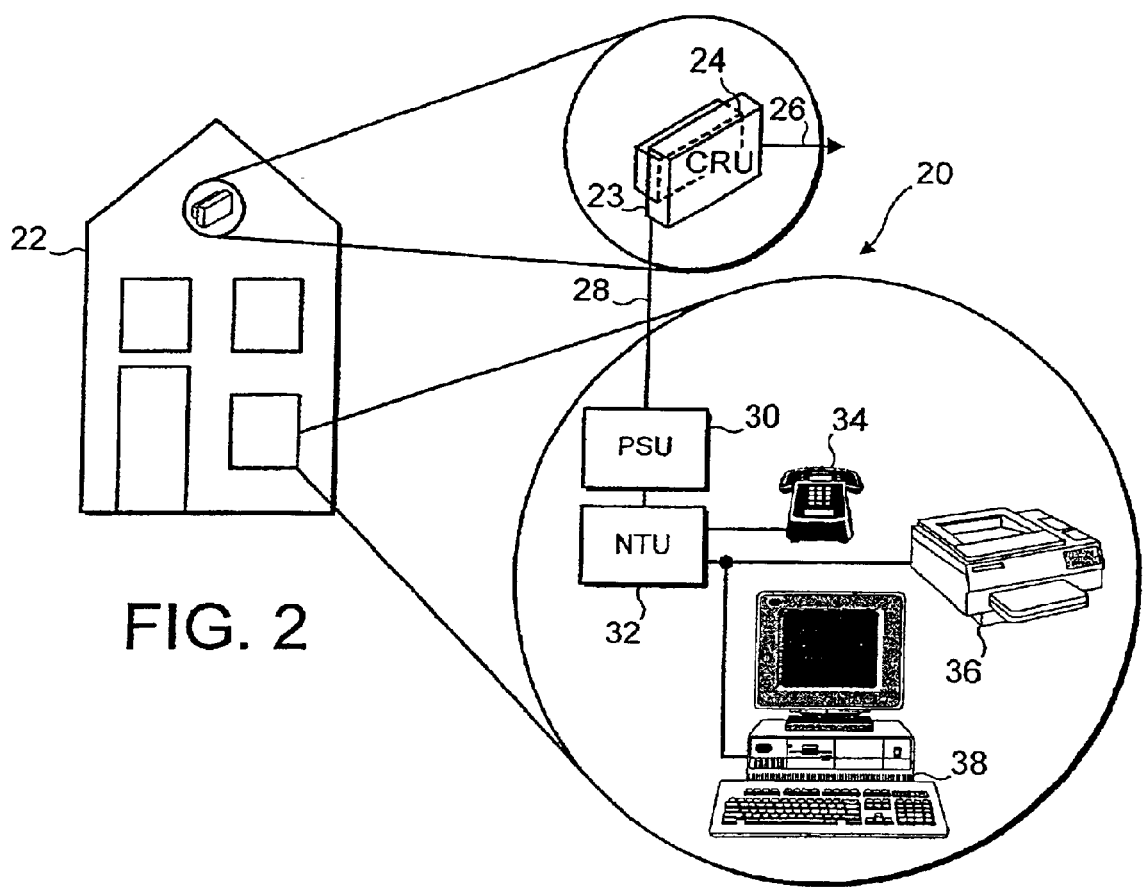
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 can support multiple lines, so that several subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3A:
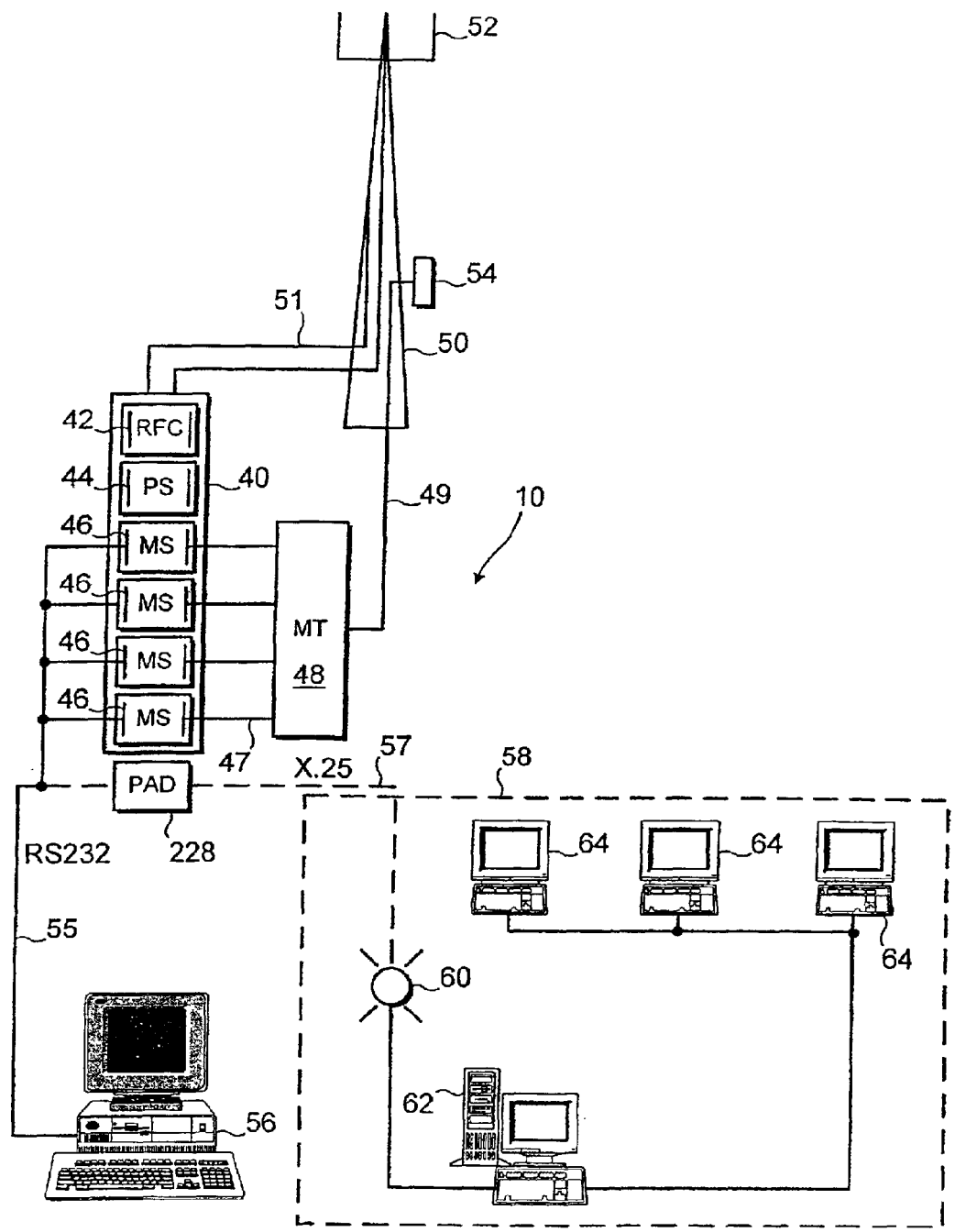
FIG. 3A is a schematic illustration of an example of a central terminal of the telecommunications system of FIG. 1.

FIG. 3A is a schematic illustration of an example of a central terminal of the telecommunications system of FIG. 1. The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the modem shelves 46 to operate in parallel. If 'n' modem shelves are provided, then the RF combiner shelf 42 combines and amplifies the power of 'n' transmit signals, each transmit signal being from a respective one of the 'n' modem shelves, and amplifies and splits received signals 'n' way so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, such as an omnidirectional antenna, mounted on a central terminal mast 50.

This example of a central terminal 10 is connected via a point-to-point microwave link to the Access Concentrator. As mentioned above, other types of connections (e.g., copper wires or optical fibres) can be used to link the central terminal 10 to the Access Concentrator. In this example the modem shelves are connected via lines 47 to a microwave terminal (MT) 48. A microwave link 49 extends from the microwave terminal 48 to a point-to-point microwave antenna 54 mounted on the mast 50 for a host connection to the Access Concentrator.

A personal computer, workstation or the like can be provided as a site controller (SC) 56 for supporting the central terminal 10. The site controller 56 can be connected to each modem shelf of the central terminal 10 via, for example, RS232 connections 55. The site controller 56 can then provide support functions such as the localisation of faults, alarms and status and the configuring of the central terminal 10. A site controller 56 will typically support a single central terminal 10, although a plurality of site controllers 56 could be networked for supporting a plurality of central terminals 10.

As an alternative to the RS232 connections 55, which extend to a site controller 56, data connections such as an X.25 links 57 (shown with dashed lines in FIG. 3A) could instead be provided from a pad 228 to a switching node 60 of an element manager (EM) 58. An element manager 58 can support a number of distributed central terminals 10 connected by respective connections to the switching node 60. The element manager 58 enables a potentially large number (e.g., up to, or more than 1000) of central terminals 10 to be integrated into a management network. The element manager 58 may be based around a powerful workstation 62 and can include a number of computer terminals 64 for network engineers and control personnel.

Figure 3B:
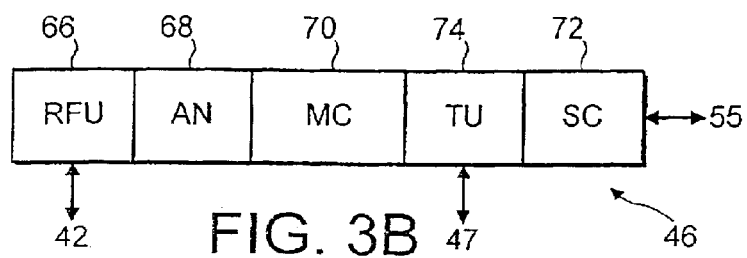
FIG. 3B is a schematic illustration of a modem shelf of a central terminal of the telecommunications system of FIG. 1.

FIG. 3B illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of the various transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This may include ½ rate convolution coding and x 16 spreading with "Code Division Multiplexed Access" (CDMA) codes on the transmit signals, and synchronisation recovery, de-spreading and error correction on the receive signals. The modem cards 70 are connected to the tributary unit (TU) 74 which terminates the connection to the Access Concentrator (e.g., via one of the lines 47) and handles the signaling of telephony information to the subscriber terminals via one of the modems. Further, each modem shelf 46 includes a shelf controller 72 that is used to manage the operation of the whole of the modem shelf and its daughter network sub-elements (NSEs). The shelf controller (SC) is provided with a RS232 serial port for connection to the site controller 56 or to the pad 228. The shelf controller communicates control and data information via a backplane asynchronous bus directly with the other elements of the modem shelf. Other network sub-elements are connected via the modem cards.

The wireless telecommunications between a central terminal 10 and the subscriber terminals 20 could operate on various frequencies, and so, for example, can be arranged to support system implementation in various frequency ranges within the PCS, ITU-R and ETSI 2 GHz and 3 GHz frequency ranges. As an example, the wireless telecommunication system may operate in the Band defined by ITU-R (CCIR) Recommendation F.701 (2025–2110 MHz, 2200–2290 MHz), where 12 uplink and 12 downlink radio channels of 3.5 MHz each may be provided centred about 2155 MHz. In this example, the duplex spacing between a corresponding uplink and downlink radio channel is 175 MHz.

In the present example, each modem shelf is arranged to support 1 frequency channel (i.e. one uplink frequency plus the corresponding downlink frequency), with techniques such as 'Code Division Multiplexed Access' (CDMA) being used to enable a plurality of wireless links (or "communication channels" as they are also referred to herein) to subscriber terminals to be simultaneously supported on a plurality of orthogonal channels within each frequency channel.

Typically, the radio traffic from a particular central terminal 10 will extend into the area covered by a neighboring central terminal 10. To avoid, or at least to reduce interference problems caused by adjoining areas, only a limited number of the available frequencies will be used by any given central terminal 10. This is discussed in more detail in GB-A-2,301,751, which also provides further details on CDMA encoding/decoding, and on the signal processing stages employed in the subscriber terminals and central terminal to manage CDMA communications between them.

The above description has provided an overview of a suitable wireless telecommunications system in which the present invention may be employed. The techniques used in preferred embodiments of the present invention to handle data packets in the wireless telecommunications system will now be discussed.

Figure 4:
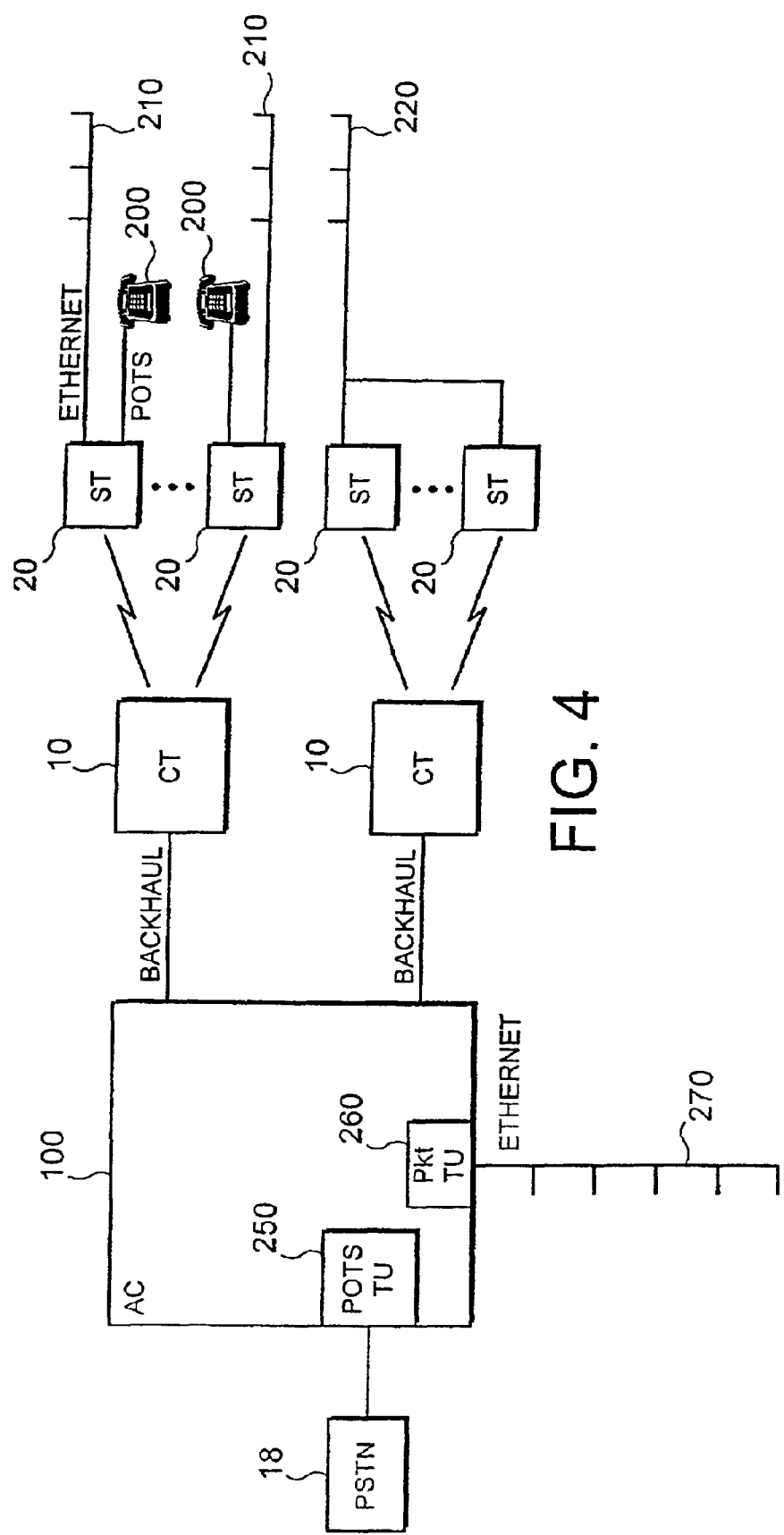
FIG. 4 is a block diagram illustrating an example deployment of a wireless telecommunications system in accordance with preferred embodiments of the present invention.

FIG. 4 is a block diagram illustrating an example deployment of a wireless telecommunications system of preferred embodiments of the present invention, which is capable of handling both data packets and voice calls. With regard to voice calls, each subscriber terminal 20 may have one or more items of telecommunications equipment 200 attached to it to enable voice calls to take place. Within the access concentrator 100, a POTS (Plain Old Telephony System) tributary unit 250 is provided as an interface to the PSTN 18, and calls are routed between the PSTN 18 and the telecommunications equipment 200 via the POTS TU 250, over the backhaul to the relevant CT 10, and over the appropriate radio channel to the relevant ST 20. The exect mechanism by which voice calls are transmitted between the AC and ST via the CT is not material to the present invention, but general background on the handling of voice calls can be found in GB-A-2,326,310 and GB-A-2,326,311.

In accordance with preferred embodiments of the present invention, the access concentrator 100 is also provided with a further tributary unit, namely a packet tributary unit 260 (hereafter referred to as the Pkt TU) to be used in place of the POTS TU 250 when handling data packets. An appropriate data link can then be connected to the Pkt TU 260 to enable data packets to be forwarded to and from the wireless telecommunications system. In the example illustrated in FIG. 4, an Ethernet connection 270 is shown, which may for example be 100 BaseT Ethernet.

Further, in preferred embodiments, the ST 20 (also referred to herein as a Packet ST) is arranged to support data packets, and enables a data link to be connected to the ST, for example an Ethernet connection 210, 220 such as 10 BaseT Ethernet.

Figure 5:
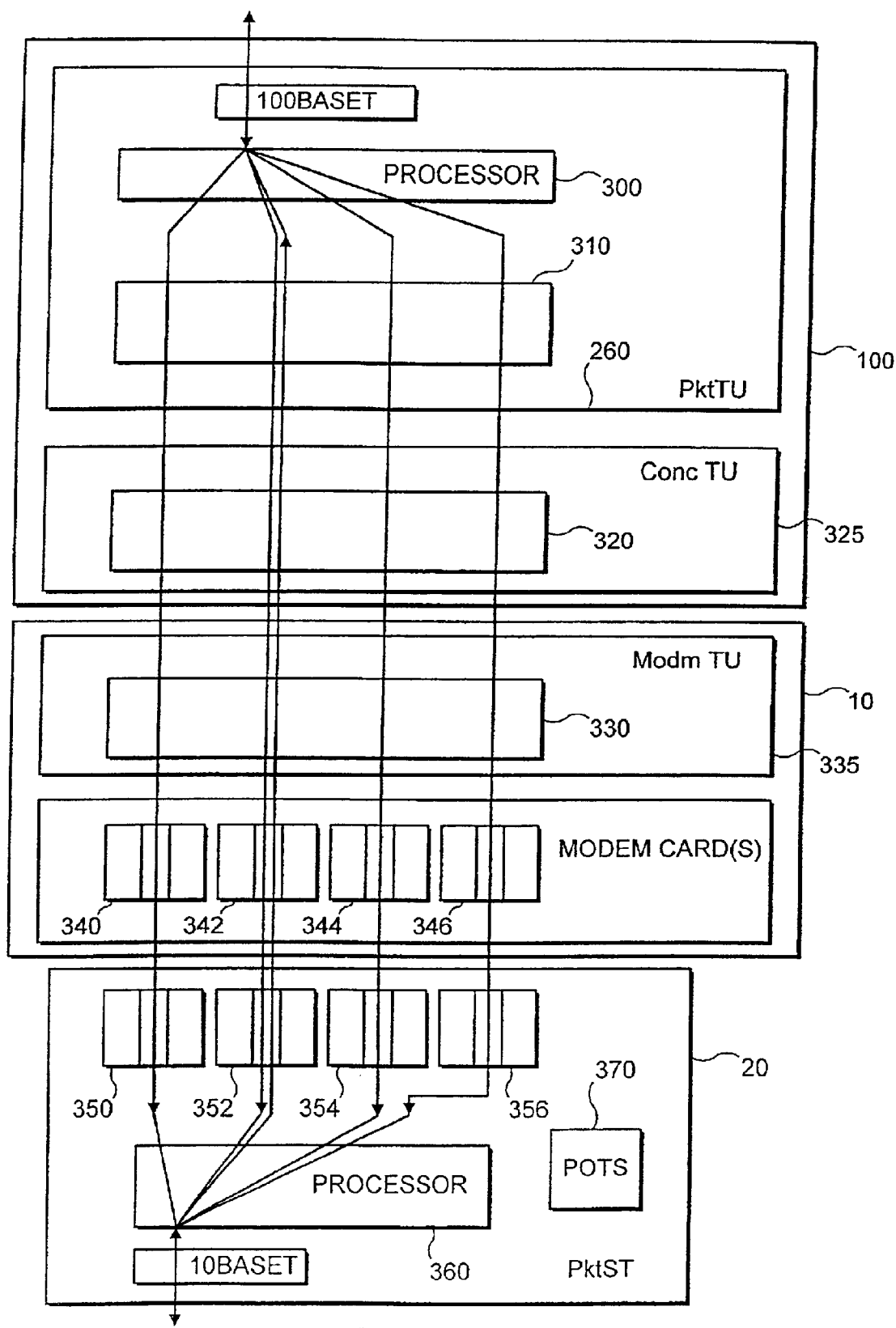
FIG. 5 is a block diagram illustrating the routing of data packets through the wireless telecommunications system of preferred embodiments of the present invention.

FIG. 5 is a block diagram illustrating in more detail the routing of data packets between the ST 20 and the access concentrator 100 in accordance with preferred embodiments of the present invention. Within the Pkt TU 260, a processor 300 is provided, which acts as a packet controller for controlling the transmission of data packets to and from the subscriber terminals over appropriate communication channels. In particular, four of the communication channels available for use by a particular subscriber terminal are allocated as a "packet group" of communication channels reserved for use in transmitting data packets. The packet group is in preferred embodiments defined by the management system, for example the site controller 56 or element manager 58 of FIG. 3A.

The function of the wireless telecommunications system when handling data packets in accordance with preferred embodiments of the present invention can be broadly summarized as an Ethernet bridge. Ethernet packets will be transferred between the 100 BaseT network connected to the Pkt TU 260 of the access concentrator 1100 and the 10 BaseT network connected to the Ethernet ports of the Packet STs 20. The system will therefore act, logically, as a number of subnets bridged through to a main network. Operating in the Ethernet (MAC address) world provides a number of benefits, namely:

1 Complete transparency of the higher level protocols;
2 Support of both IP and IPX and any protocol with no impact on the operating software; and
3 No need for specific interface to routers.

Each ST is capable in preferred embodiments of supporting a local sub-network of up to 64 devices (MAC addresses) via its Ethernet connection 210. In certain circumstances, it will be possible to connect two (or more) Packet STs to the same local subnet to increase performance of the uplink and/or downlink, as is schematically illustrated by the Ethernet 220 in FIG. 4.

The Pkt TU 260 is capable of supporting up to 16,384 MAC addresses in preferred embodiments. The MAC addresses that are stored in the PTU are the MAC addresses of the devices attached to each ST's 10 BaseT port, the MAC address of the ST itself, and the MAC addresses of devices attached to the PTU's 100 BaseT port.

The system will initialise and update its routing tables by inspecting the source MAC address of all packets processed. The system built up tables recording the location in the network of all the devices attached to the STs, thereby allowing successful routing of the packets transparently through the wireless telecommunications system from the Pkt TU 260 on the access concentrator 100 to the Packet ST 20. Fundamentally, the data packets can be thought of as being transferred from the Pkt TU 260 to the Packet ST 20 via a communications pipe, and transparent to the general switching logic of the various intervening elements of the wireless telecommunication system. This is achieved by configuring the Modem TU 335 and Conc TU 325 to pipe groups of communication channels straight through to the Pkt TU 260 to establish a direct communication path between the Pkt STs 20 and the Pkt TU 260 using the bearer timeslots of each group.

Accordingly, as illustrated in FIG. 5, data packets can be transmitted simultaneously on four communication channels defined within the packet group, these data packets passing transparently through the switch logic 310, 320 and 330 provided within various tributary units of the access concentrator 100 and the CT 10. These data packets will also pass through appropriate communications units 340, 342, 344 and 346 on the relevant modem card(s) of the CT 10. In preferred embodiments, these communications units are individual modems, which may be provided on one or more chips.

Since, in this example, the Packet Group is defined such that four communications channels can simultaneously be used for the transfer of data packets, a corresponding number of communications units 350 352, 354 and 356 are provided within the Pkt ST 20, again these communications units in preferred embodiments being individual modems. As will be appreciated by those skilled in the art, these modems may be packaged within a single chip, or on multiple chips. A processing element 360 is used to act as a subscriber controller within the subscriber terminal for handling the various data packets received by the ST over the packet group, along with data packets to be transmitted from the ST to the access concentrator 100.

When the Pkt ST 10 is not making a voice call, the processor 360 is arranged to ensure that the ST listens to the four downlink communication channels in the packet group using its four modems 350, 352, 354, 356. In preferred embodiments, each downlink communication channel has a bandwidth of 160 Kbits/sec, and each downlink communication channel is actually configured as two 64 Kbit/sec HDLC channels. These eight HDLC links are originated at the processor 300 of the Pkt TU 260 and terminated at the processor 360 of the Pkt ST 20. When the ST wishes to transmit a packet, the processor 360 is arranged to acquire one of the available uplink communication channels for transmission of that data packet. In preferred embodiments, the four uplink communication channels in the packet group are actually configured as sixteen 32 Kbit/sec uplink communication channels, and the ST is arranged to acquire one of those sixteen uplink communication channels for the transmission of data packets to the access concentrator. As will be discussed in more detail later, predetermined criteria are applied to determine how long that uplink communication channel remains acquired for by the ST.

Figure 6:
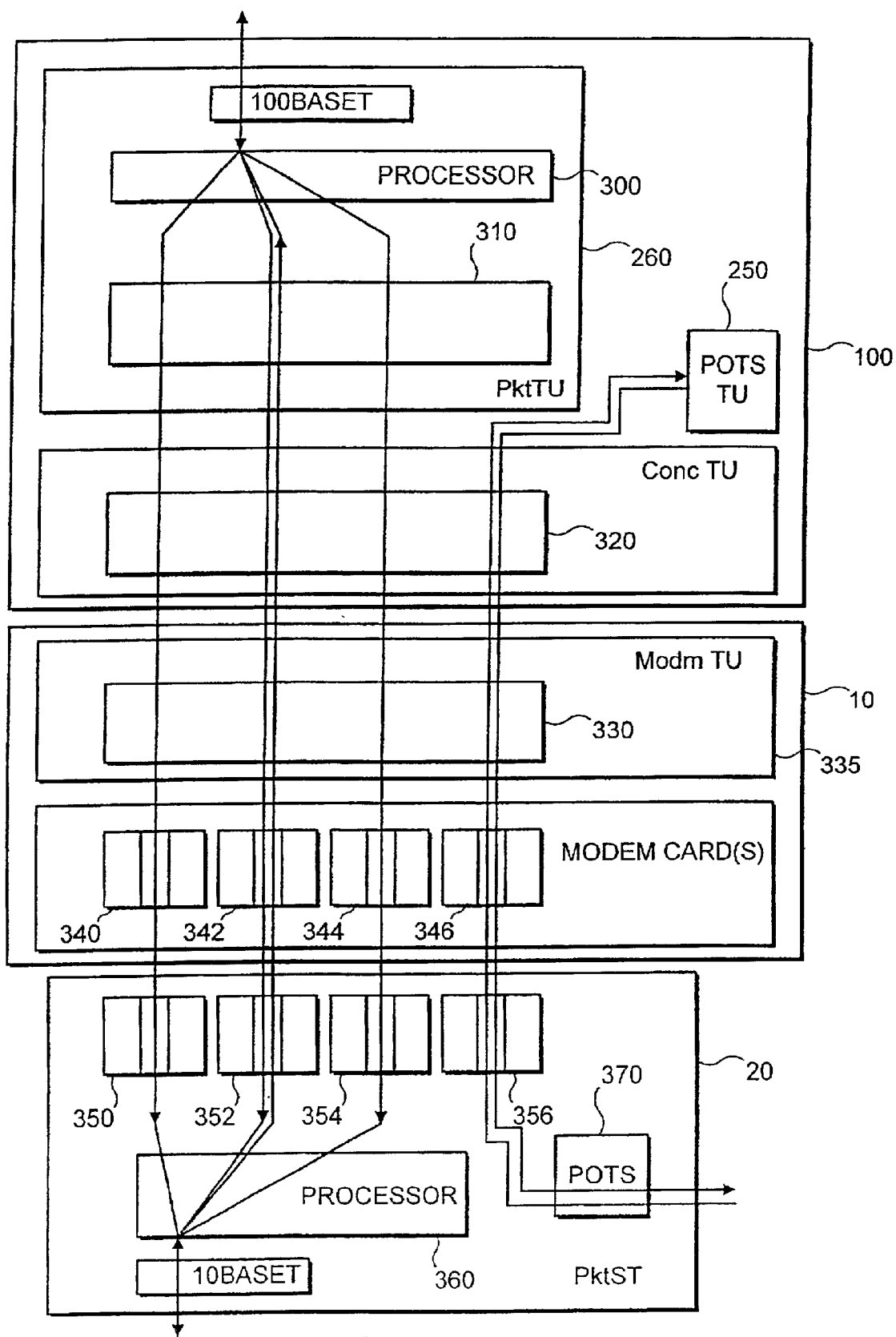
FIG. 6 is a block diagram illustrating how a voice call is handled by the wireless telecommunications system of preferred embodiments of the present invention.

Each subscriber terminal 20 is also arranged to support voice calls, as indicated by the POTS processing element 370. However, it would be costly to provide an additional modem purely to handle voice calls, since a significant number of modems are already required within the Pkt ST to handle the desired bandwidth required for data packets. Accordingly, in preferred embodiments, the processor 360 is arranged, when a voice call is to take place, to assign one of the plurality of modems 350, 352, 354 and 356 to that voice call, and to then inform the Pkt TU 260 that the corresponding communication channel is then not available for transfer of data packets. This is illustrated schematically in FIG. 6, where the modem 356 has been assigned to a voice call, such that the voice call can then be routed between the POTS processing element 370 in the Pkt ST 20 and the POTS TU 250 on the access concentrator 100 via the modem 356, and the relevant resources within the CT 10 and the AC 100.

Figure 7:
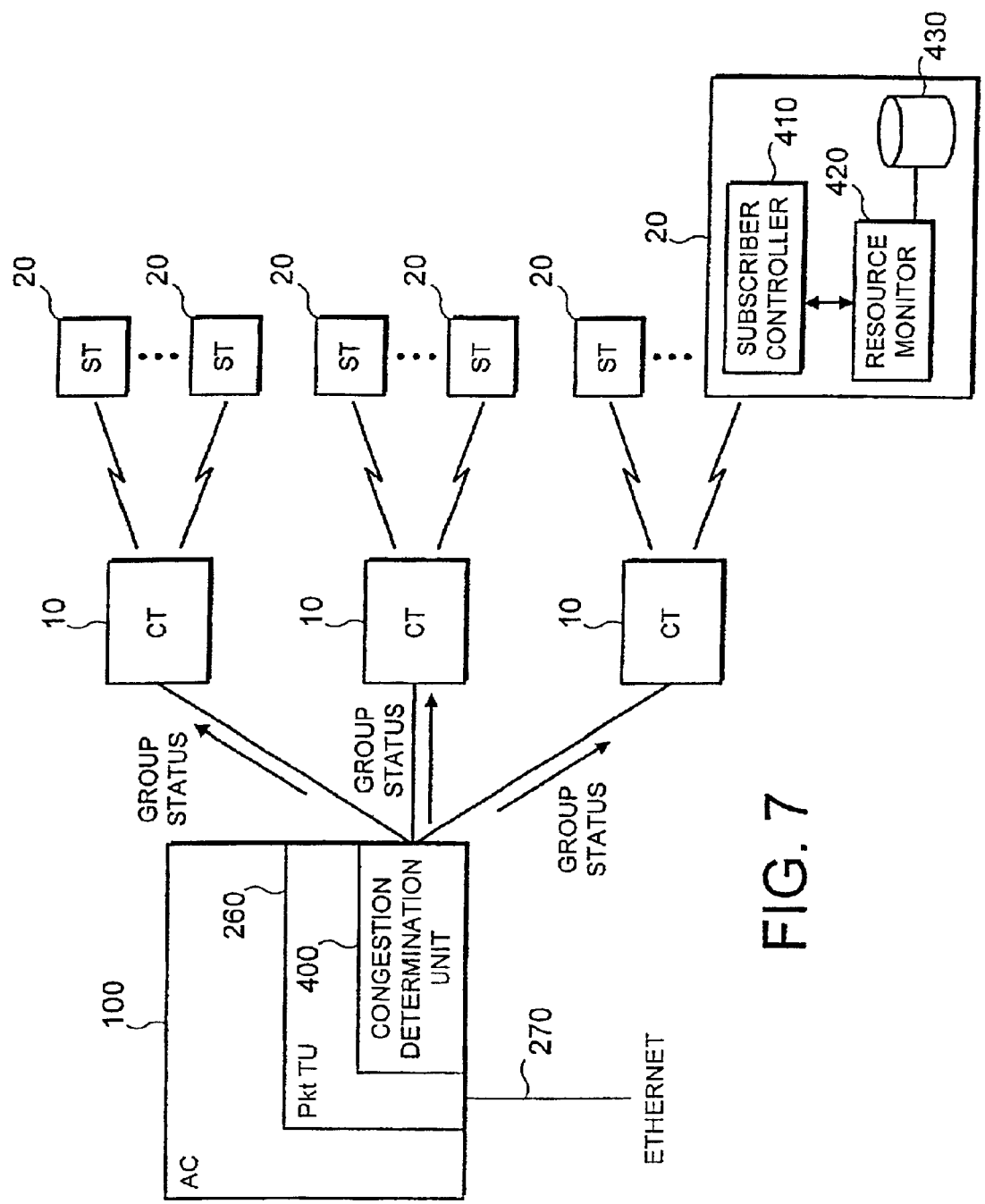
FIG. 7 is a block diagram illustrating the elements of the wireless telecommunications system involved in managing the length of time an uplink communication channel is acquired for by a subscriber terminal in accordance with preferred embodiments of the present invention.

The technique used in preferred embodiments to control how long an ST is able to acquire an uplink communication channel from the packet group for will now be discussed in detail with reference to FIG. 7. Since the communication channels in the packet group are shared, it is not possible for each subscriber terminal to permanently acquire an uplink communication channel for the sending of data packets from the ST to the AC. Accordingly, one approach would be to treat each data packet as a micro call, whereby when a subscriber has a data packet to send, it acquires an uplink communication channel, sends the data packet, and then releases the uplink communication channel for use by other subscriber terminals. However, the time taken to acquire and release the uplink communication channel in such a wireless telecommunications system is typically non-trivial, and hence this approach is likely to significantly impact the efficiency of the system.

In preferred embodiments, an alternative approach is employed, whereby the ST is allowed to acquire an uplink communication channel for a longer period than that required to send an individual data packet, but the ST is prevented from holding on to that uplink communication channel indefinitely. To implement this, information based on traffic loading of the communication channels dedicated to packet groups within the telecommunications system are used to determine a number of parameters which are then used by individual STs to determine when to release an uplink communication channel for use by other STs. With reference to FIG. 7, a congestion determination unit 400 is provided within the access concentrator 100 for determining a control variable to be used when deriving the various parameters. In preferred embodiments, the congestion determination unit is embodied by software executing on the Pkt TU 260. As all data traffic flows through the Pkt TU 260, it is clear that the congestion determination unit 400 can keep track of the total transmitted and received bytes of data being transferred over the various communication channels provided for transfer of data packets. In preferred embodiments, this information is used by the congestion determination unit 400 to calculate a 16-bit unsigned scaled value representing the system load, which is then disseminated periodically to all Pkt STs 20 as part of a GroupStatus message issued by the AC 100. Each Pkt ST 20 is arranged to calculate a number of parameters based on that control variable, as will be discussed further below.

As regards the calculation of the control variable by the congestion determination unit 400, a variable NunPacketRw is set equal to the total number of communication channels allocated to the various packet groups supported by the Pkt TU 260. For example, if the Pkt TU 260 supports two packet groups, the first packet group comprising communication channels 1, 2, 3 and 4, and the second packet group comprising packet groups 1, 2, 5, 6, then the variable NumPacketRw will be equal to 6.

Then, a variable TotalTraffic is set equal to the total transmit bytes plus the total receive bytes passing through the Pkt TU in a set period X. A further variable to be used in the equation is MaxTrafficPossiblePerRw, which in preferred embodiments is 16,384 bytes/sec (128 Kbit/sec).

Using the above identified variables, the congestion determination unit 400 is then arranged to perform the following calculation:

$MaxTrafficPossible=$
$\quad (NumPacketRw*MaxTrafficPossiblePerRw)*(X/1\ second)$ $Load=(TotalTraffic*\ 100)/MaxTrafficPossible$ It can be seen that the variable Load then represents the load as a percentage, and hence can vary from 0 to 100. This variable Load is then used in an averaging calculation over the last ten load calculations to produce a variable AveragedLoad. The following calculation is then performed:

If AveragedLoad is less than 100

$ControlVariable=AveragedLoad*(65535/100)$ else $ControlVariable=65535$

In the above calculation, it should be noted that 65535 is the maximum value that a 16 bit unsigned scaled value can have. From the above calculation, it can be seen that if the AveragedLoad is less than maximum load, then the control variable is set equal to the AveragedLoad multiplied by 65535/100. Otherwise, it is assumed that the loading is at a maximum, and accordingly the control variable is set equal to 65535.

The control variable is then inserted into the GroupStatus message sent periodically to all Pkt STs 20 from the AC 100. A resource monitor 420 is preferably provided within each Pkt ST 20 for determining a number of parameters based on the control variable, and for using those parameters to determine when the subscriber controller 410 within the ST should release a particular uplink communication channel. The resource monitor 420 and subscriber controller 410 will in preferred embodiments be embodied as software running on the processor 360. The resource monitor 420 is arranged to store the various parameters in a storage 430, which may be embodied by RAM, EEPROM, etc within the ST 20.

In preferred embodiments, three parameters are determined by the resource monitor 420, and these are illustrated schematically in FIGS. 8A and 8B. With reference to FIG. 8A, a parameter MaxHoldTime is calculated identifying the maximum time that an uplink communication channel may be held by a particular ST, after which it must be released even if more data packets are awaiting to be sent by that ST. In association with this, a parameter MinDownTime is also calculated identifying the minimum time that the uplink communication channel must be released for before another acquisition of an uplink communication channel in the packet group is attempted by the subscriber terminal.

Hence, as illustrated in FIG. 8A, when a particular ST initiates acquisition of an uplink communication channel for sending data packets, at time $t_1$ as illustrated in FIG. 8A, a timer is started. Once the uplink communication channel has actually been acquired, at time $t_2$, the first data packet 500 can be sent, and this can be followed by a number of further data packets 500 as illustrated in FIG. 8A. Although the packets are illustrated in FIGS. 8A and 8B as being separated by a finite gap, it should be noted that in preferred embodiments there is no requirement for a gap between the packets, as the encoding of the packets (in preferred embodiments LADP encoding is used) directly identifies the beginning/end of each packet without the need for an actual time gap.

In FIG. 8A, it is assumed that the ST is busy, and has a continual stream of data packets to send. Nevertheless, at a certain point in time ($t_{10}$ as shown in FIG. 8), the value of the timer will reach MaxHoldTime, and the link will be dropped by the ST. A further timer will then begin running, and only once that timer reaches a value of MinDownTime will that ST be able to seek acquisition of another uplink communication channel for the sending of subsequent data packets.

In addition to the above two parameters, a third parameter identifying a programmable time out period is also provided, this parameter being referred to as a parameter Timeout in FIG. 8B. After each data packet has been sent, a timer begins running, and if the timer reaches the value Timeout before any further data packet is sent, the communication channel is dropped by the ST even if MaxHoldTime has not been reached. This avoids an ST holding on to an uplink communication channel even when it has no data to send. Hence, as illustrated in FIG. 8B, two data packets 500 are sent, the second data packet having been sent at time $t_5$, at which point the timer begins running. At time $t_6$, that timer has reached a value of Timeout, and accordingly the communication channel is dropped by the ST. Irrespective of whether the communication channel is dropped as a result of the parameter MaxHoldTime being reached or the parameter Timeout being reached, the ST must still wait until the parameter MinDownTime has expired before seeking acquisition of a further uplink communication channel.

In preferred embodiments, the above three parameters are set as follows. The parameter Timeout is preferably a parameter specified directly via the management system, and hence may be specified at the time each ST is configured for use in the wireless telecommunications system. The remaining two parameters are in preferred embodiments calculated as follows:

$$MinDownTime = ControlVariable/(ServiceGrade+1)$$

$$MaxHoldTime = MaxOnPeriod - MinDownTime.$$

The parameter ServiceGrade will be a value from 0 to n determined by the management system, dependent on the grade of service appropriate to the particular customer (a higher value indicating a better grade of service). Accordingly, it can be seen that for a particular loading of the system, the better the grade of service, the lower the MinDownTime parameter. The parameter MaxOnPeriod will be a set time frame, again preferably specified by the management system. The MaxHoldTime is then merely calculated by subtracting the MinDownTime from that parameter. Accordingly, a customer having a high Service-Grade will expect a lower MinDownTime to be determined, which will automatically give rise to a longer MaxHoldTime.

Figure 9A:
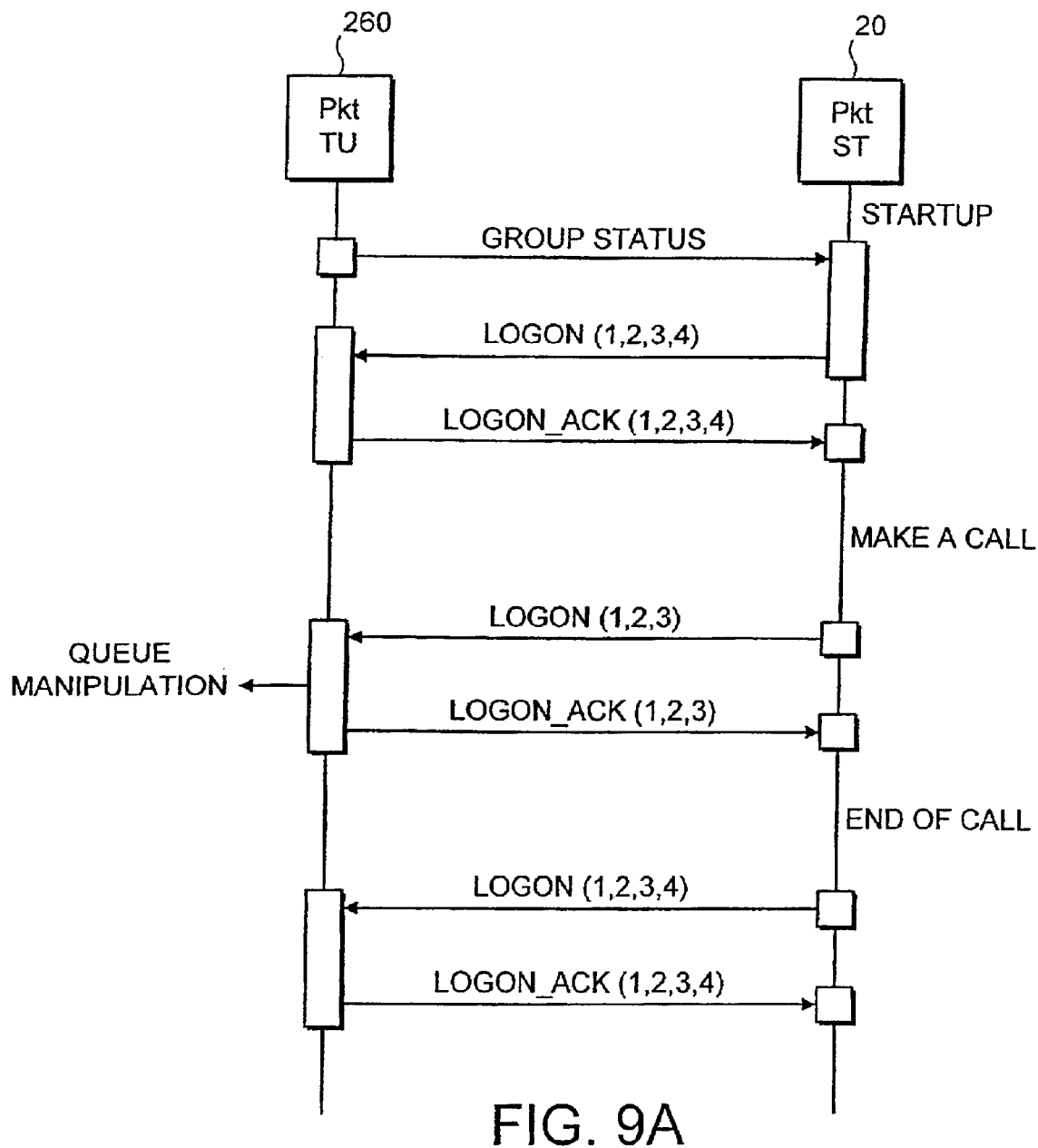
FIGS. 9A and 9B are interaction diagrams illustrating the protocol used for transmission of channels messages between the subscriber terminal and the access concentrator in accordance with preferred embodiments of the present invention.

In addition to managing the length of time that any particular uplink communication channel is acquired for by an ST, as mentioned previously with reference to FIGS. 5 and 6, the system of preferred embodiments of the present invention enables all of the modems within the Pkt ST to be arranged to monitor communication channels in the packet group in the absence of any voice call, but for one or more of the modems to be assigned to the handling of voice calls as and when required. This requires the Pkt TU 260 to be kept up-to-date with information about which communication channels in the packet group are being monitored by any particular ST, so that it can ensure correct routing of data packets to the ST. As will be discussed with reference to FIG. 9A, this preferably takes place via a communication protocol between the Pkt ST 20 and the Pkt TU 260 on the access concentrator 100. When a Pkt ST is initialised (for example when it is switched on, or re-initialised following some fault), the ST performs a net entry process, during which a Link Acquisition (LAC) channel is acquired. This process involves acquiring the relevant LAC downlink communication channel, after which it is subsequently invited to acquire the corresponding LAC uplink channel. At this point, the ST then receives configuration details relevant to the ST, including the identification of a particular RW code for a broadcast communication channel within the relevant packet group. At this point, the ST then drops the uplink channel, and acquires the downlink channel for the indicated broadcast communication channel of the packet group. With reference to FIG. 9A, all of the above process is indicated by the "STARTUP" state of the Pkt ST 20 identified in FIG. 9A.

Periodically, the Pkt TU 260 will broadcast a GroupStatus message on the broadcast channel of the packet group. In addition to identifying the control variable as discussed earlier with reference to FIG. 7, the GroupStatus message identifies all of the communication channels within the packet group. Accordingly, through the periodic transmission of the GroupStatus message, it is possible to vary the packet group over time if desired. When the ST first receives the GroupStatus message, it acquires the downlink communication channel for all of the communication channels identified in the packet group. This assumes that in preferred embodiments, a sufficient number of modems are provided within the ST to enable simultaneous acquisition of all of the communication channels in the packet group. However, it will be appreciated that in alternative embodiments, the packet group may include more communication channels than the Pkt ST has modems available, and accordingly only a subset of the communication channels in the packet group may be acquired by the ST (for example the broadcast communication channel, plus a random subset of the other communication channels in the packet group). Nevertheless, the basic principle is that in preferred embodiments in the absence of a voice call, all of the modems within the ST are used to acquire a downlink of a corresponding communication channel in the packet group.

Once the downlink communication channels have been acquired, the Pkt ST 20 will acquire one of the uplink communication channels, and then send a logon message to the Pkt TU 260 to confirm which communication channels are being monitored by that ST. For example, as illustrated in FIG. 9A, it is assumed that the GroupStatus message identifies communications channels 1, 2, 3 and 4 as being within the relevant packet group, and that accordingly the Pkt ST 20 acquires the downlink of those four communication channels, and sends a logon message to the Pkt TU 260 to confirm that all four channels are being monitored. When the Pkt TU 260 receives the logon message (or channels message as it may also be referred to herein), it records that information, and sends an acknowledge message back to the Pkt ST confirming the information that it has received.

If the Pkt ST 20 subsequently needs to make a call, the subscriber controller within the Pkt ST 20 (preferably software running on the processor 360) will assign one of the modems to the task of handling the voice call. In preferred embodiments, it will choose a modem which is monitoring a communication channel that is not a broadcast channel of the packet group. The POTS processing logic within the ST can then use that modem to acquire a communication channel for the voice call in the standard manner.

However, it is important that the fact that the communication channel previously being monitored by that modem is no longer being monitored is fed back to the Pkt TU 260. Accordingly, at this point, the Pkt ST 20 resends the logon message identifying the channels now being monitored. Hence, with reference to FIG. 9A, where it is assumed that the modem that was previously monitoring communication channel 4 has now been allocated to a voice call, the logon message identifies that only channels 1, 2 and 3 are now being monitored. Upon receipt by the Pkt TU 260, it will update its records, and again send an acknowledgement message back to the Pkt ST 20. At the same time, if the logon message is identifying a decreased number of communication channels, as it is here, then the Pkt TU 260 will trigger off a queue manipulation technique to re-queue any packets destined for that Pkt ST 20 which are queued in a communication channel no longer being monitored by that ST. This process will be discussed further later with reference to FIG. 10.

Once the voice call has subsequently terminated, the modem resource can be reassigned to the task of monitoring a communication channel in the packet group, and accordingly the logon message is again sent from the Pkt ST 20 to the Pkt TU 260 to identify the communication channels now being monitored. Hence, as illustrated in FIG. 9A, the modem can be re-assigned to communication channel 4, and once the downlink is acquired, a logon message can be sent to the Pkt TU 260 identifying that communication channels 1, 2, 3 and 4 are now being monitored. Again, the Pkt TU will record this information, and return an acknowledgement message to the Pkt ST 20.

Figure 9B:
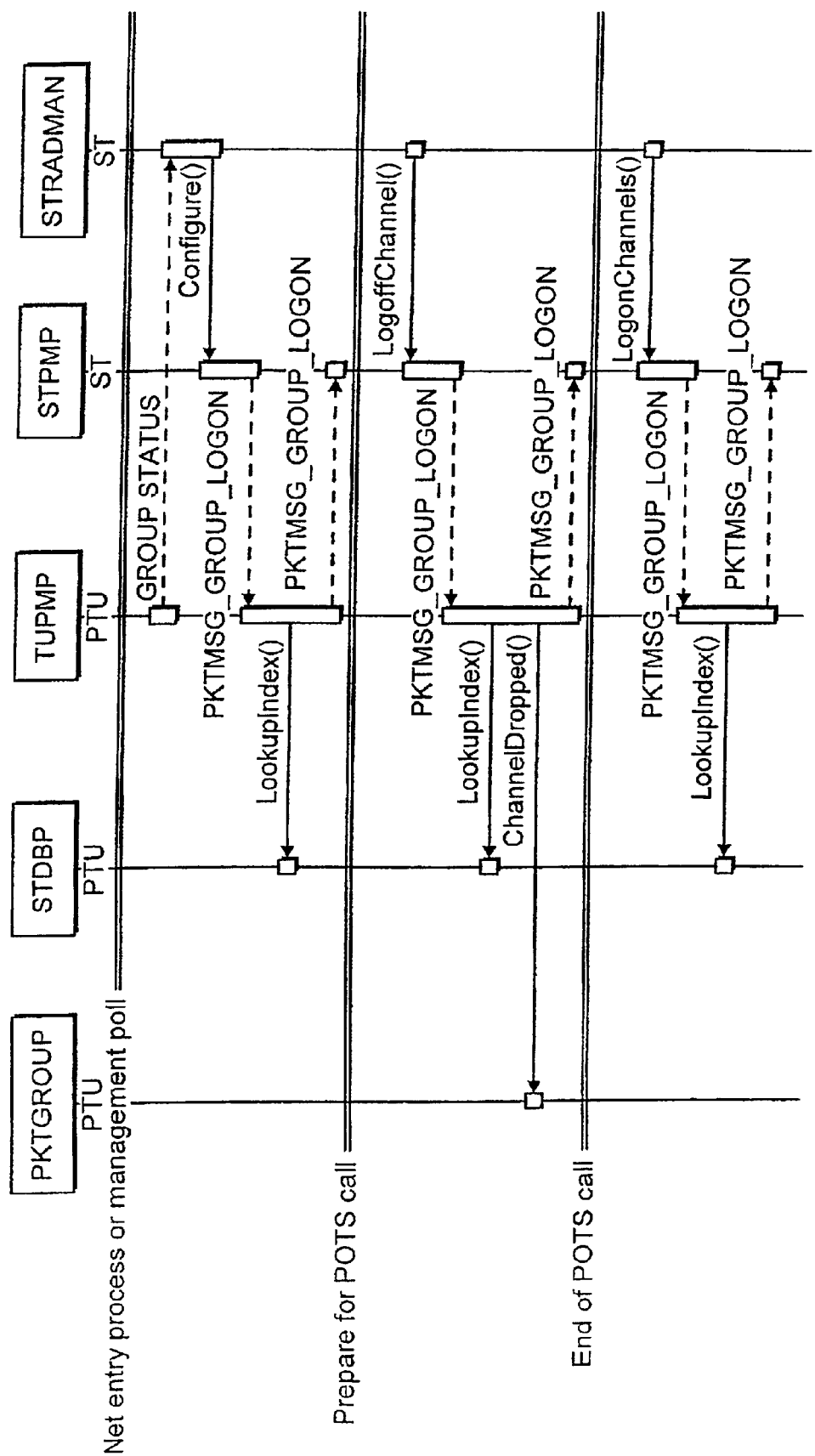

In preferred embodiments, a number of software entities on both the Pkt ST 20 and the Pkt TU 260 are used to implement the communication protocol illustrated in FIG. 9A. For the interested reader, more details of the communications passed between the various software elements in preferred embodiments to implement this communication protocol are illustrated in FIG. 9B. Within the Pkt ST, two software entities are involved, namely the STRADMAN, which performs the radio management function for the ST, and the STPMP, which is an ST specific version of a packet management protocol. The STPMP basically provides the decision making for packet transfer.

Within the Pkt TU (referred to as a PTU in FIG. 9B), three software entities are involved, namely the PKTGROUP which is an object class that represents a single group of downlink communication channels forming a packet group, an STDBP, which is an ST database for the Pkt TU, and a TUPMP which is a Pkt TU specific version of the packet management protocol. The TUPMP makes the various decisions regarding packet transfer, etc. As will be apparent from reviewing FIG. 9B, the basic flow is as shown in FIG. 9A, although FIG. 9B shows more details of functions calls and messages passed between the various software elements. As will be apparent from a comparison of FIG. 9A and FIG. 9B, the message PKTMSG_GROUP_LOGON is equivalent to both the logon and the logon_ack messages of FIG. 9A. Further, as can be seen from FIG. 9B, when the logon message indicates a reduced number of communication channels being monitored, this information gets fed back to the packet group software entity via a ChannelDropped function call, and it is this process which initiates the queue manipulation to be discussed in more detail later with reference to FIG. 10.

The re-queuing mechanism of the preferred embodiments will now be discussed in more detail with reference to FIG. 10. As illustrated schematically in FIG. 10, it is assumed that ST A and ST B are both monitoring communication channels 1, 2, 3 and 4 of a particular packet group. As packets are received for distribution to the STs, the packet controller 620 is responsible for placing those data packets on an appropriate queue within storage 600, one queue being provided for each communication channel. Generally, assuming all communication channels within the packet group are being monitored by the relevant ST, the packet controller will merely place the data packet on the queue that is least full. As mentioned earlier, the Pkt TU 260 will receive via logon messages information concerning the channels being monitored by each ST, and this information is stored by the packet controller 620 within a local storage 630.

If ST B subsequently indicates that it is no longer monitoring communication channel 4, then this information will be stored within the record 630. In addition, since the packet controller 620 has identified that there is a reduction in the number of communication channels being monitored, it will instruct the queue manager 610 to perform some redistribution of data packets destined for ST B that are already placed in the corresponding queue for communication channel 4. As illustrated schematically in FIG. 10, the queue manager will do this by looking through the queue, and placing each data packet destined for ST B on the queue that is least full. Hence, with reference to FIG. 10, the first and second data packets destined for ST B will be placed on queue 2, after which queue 2 will now be longer than queue 3, and accordingly the next data packet destined for ST B will be re-queued on queue 3. If no communication channels in the packet group are being monitored by ST B, or if there is no space on a queue for a particular packet, then in preferred embodiments the packet is dropped.

In preferred embodiments, the protocol used by the ST to handle data packets is able to handle data packets received out of sequence, and to request any missing packets, and accordingly the above re-queuing mechanism is an appropriate solution. However, if sequencing were an issue, it will be appreciated that a number of known re-sequencing techniques could be employed by the queue manager when re-queuing data packets.

Once the re-queuing has taken place, the packet controller 620 can just be arranged for all subsequent data packets to place data packets for ST B on the queues for either communication channels 1, 2 or 3, and will no longer place any data packets for ST B on the queue for communication channel 4 until such time as it receives a further logon message from ST B confirming that it is now monitoring communication channel 4.

In preferred embodiments, the function of the packet controller 620 and the queue manager 610 are embodied by software running on the processor 300 of the Pkt TU 260.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A wireless telecommunications system for connecting to a data link and for routing data packets between the data link and a subscriber terminal of the wireless telecommunications system, the subscriber terminal being connectable to a central terminal of the wireless telecommunications system via a radio resource, the wireless telecommunications system providing a group of communication channels arranged to utilize the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the wireless telecommunications system further comprising:

a subscriber controller within the subscriber terminal arranged, when a data packet is to be transmitted to the data link, to acquire an uplink communication channel from the group to enable that data packet to be transmitted via the central terminal to the data link;

a resource monitor within the subscriber terminal, for receiving information concerning the traffic loading of predetermined elements of the wireless telecommunications system, and for applying predetermined criteria based on that information to determine how long the uplink communication channel may be acquired for by the subscriber terminal for its own use before causing the subscriber controller to release the uplink communication channel for use by other subscriber terminals, arranged so that the subscriber terminal is allowed to acquire the uplink communication channel for a longer period than that required to send an individual data packet, but is prevented from keeping the uplink communication channel acquired indefinitely.

2. A wireless telecommunications system as claimed in claim 1, further comprising a congestion determination unit for determining the information concerning the traffic loading of the predetermined elements of the wireless telecommunications system and for periodically broadcasting that information to the subscriber terminal, the resource monitor being arranged to use that broadcast information when applying the predetermined criteria.

3. A wireless telecommunications system as claimed in claim 2, wherein the resource monitor is further arranged to receive local information relating to its subscriber terminal and uses that local information in addition to the broadcast information when applying the predetermined criteria.

4. A wireless telecommunications system as claimed in claim 1, wherein the resource monitor is arranged to determine from the received information a first parameter identifying the maximum hold time of the uplink communication channel after which it must be released even if more data packets are waiting to be sent by the subscriber terminal, the first parameter being used by the resource monitor when applying the predetermined criteria.

5. A wireless telecommunications system as claimed in claim 1, wherein the resource monitor is arranged to determine from the received information a second parameter identifying the minimum time the uplink communication channel must be released for before another acquisition of an uplink channel in the group is attempted by the subscriber terminal, the second parameter being used by the resource monitor when applying the predetermined criteria.

6. A wireless telecommunications system as claimed in claim 1, wherein the resource monitor is arranged to determine a third parameter identifying a programmable timeout period, the third parameter being used by the resource monitor when applying the predetermined criteria, such that after each data packet is sent, the programmable timeout period is reset, and if no further packets have been sent by the time the programmable timeout period expires, the uplink communication channel is released by the subscriber terminal.

7. A wireless communication channel as claimed in claim 6 wherein the resource monitor is arranged to determine from the received information a first parameter identifying the maximum hold time of the uplink communication channel after which it must be released even if more data packets are waiting to be sent by the subscriber terminal, the first parameter being used by the resource monitor when applying the predetermined criteria, and wherein the first and third parameters are used by the resource monitor when applying the predetermined criteria, whereby even if the programmable timeout period has not expired, the uplink communication channel will still be released if the maximum hold time of the uplink communication channel has been reached.

8. A wireless telecommunications system as claimed claim 2, wherein the information concerning the traffic loading of the predetermined elements of the wireless telecommunications system is determined by the congestion determination unit based on the actual traffic information from those predetermined elements and the number of communication channels in the group.

9. A wireless telecommunications system as claimed in claim 1, wherein the radio resource is one or more frequency channels, and the communication channels are orthogonal channels.

10. A wireless telecommunications system as claimed in claim 1, wherein the group of communication channels is programmable, and information identifying the communication channels forming the group is distributed to the subscriber terminal over a broadcast communication channel.

11. A subscriber terminal for a wireless telecommunications system arranged to handle data packets routed between a data link and the subscriber terminal via the wireless telecommunications system, the subscriber terminal being connectable to a central terminal of the wireless telecommunications system via a radio resource, the wireless telecommunications system providing a group of communication channels arranged to utilize the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the subscriber terminal comprising:

a subscriber controller arranged, when a data packet is to be transmitted to the data link, to acquire an uplink communication channel from the group to enable that data packet to be transmitted via the central terminal to the data link; and a resource monitor for receiving information concerning the traffic loading of predetermined elements of the wireless telecommunications system, and for applying predetermined criteria based on that information to determine how long the uplink communication channel may be acquired for by the subscriber terminal for its own use before causing the subscriber controller to release the uplink communication channel for use by other subscriber terminals, arranged so that the subscriber terminal is allowed to acquire the uplink communication channel for a longer period than that required to send an individual data packet, but is prevented from keeping the uplink communication channel acquired indefinitely.

12. A method of operating a wireless telecommunications system to route data packets between a data link connected to the wireless telecommunications system and a subscriber terminal of the wireless telecommunications system, the subscriber terminal being connectable to a central terminal of the wireless telecommunications system via a radio resource, the wireless telecommunications system providing a group of communication channels arranged to utilized the radio resource for transmission of data packets, the group being shared by a plurality of subscriber terminals and consisting of downlink communication channels for transmission of data packets from the central terminal to the subscriber terminals and uplink communication channels for transmission of data packets from the subscriber terminals to the central terminal, the method comprising the steps of:

(a) when a data packet is to be transmitted to the data link by the subscriber terminal, causing the subscriber terminal to acquire an uplink communication channel from the group to enable that data packet to be transmitted via the central terminal to the data link;

(b) receiving at the subscriber terminal information concerning the traffic loading of predetermined elements of the wireless telecommunications system;

(c) applying at the subscriber terminal predetermined criteria based on the information received at said step (b) to determine how long the uplink communication channel may be acquired for by the subscriber terminal for its own use before being released by the subscriber terminal for use by other subscriber terminals; and (d) causing the subscriber terminal to release the uplink communication channel when indicated by the determination performed at said step (c), so that the subscriber terminal is allowed to acquire the uplink communication channel for a lower period than that required to send an individual data packet, but is prevented from keeping the uplink communication channel acquired indefinitely.

13. A method as claimed in claim 12, further comprising the step of:

determining the information concerning the traffic loading of the predetermined elements of the wireless telecommunications system and periodically broadcasting that information to the subscriber terminal.

14. A computer program operable to configure a wireless telecommunications system to perform a method as claimed in claim 12.

15. A carrier medium comprising a computer program as claimed in claim 14.

* * * * *